US008949094B2

(12) United States Patent
Nath et al.

(10) Patent No.: US 8,949,094 B2
(45) Date of Patent: Feb. 3, 2015

(54) THERMAL DEFLECTION ANALYSIS

(75) Inventors: Sanjib Nath, Marysville, OH (US); Lisa J. Feick, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 13/437,844

(22) Filed: Apr. 2, 2012

(65) Prior Publication Data

US 2013/0262050 A1    Oct. 3, 2013

(51) Int. Cl.
*G06G 7/48* (2006.01)

(52) U.S. Cl.
USPC ........................................ 703/7; 703/6; 703/8

(58) Field of Classification Search
CPC ............. G06F 7/60; G06F 17/12; G06G 7/70; G06G 7/64; G01G 19/08; G01G 23/01; B60R 19/02; B60R 19/34; B60R 19/30; F21V 17/02; G01J 1/04; B29C 39/44; B29C 37/00; B32B 5/18
USPC ........ 703/1, 2, 6, 7, 8; 362/512; 293/133, 136
See application file for complete search history.

(56) References Cited

U.S. PATENT DOCUMENTS

| | | | |
|---|---|---|---|
| 4,742,473 A | 5/1988 | Shugar et al. | |
| 4,912,664 A | 3/1990 | Weiss et al. | |
| 5,150,935 A * | 9/1992 | Glance et al. | 293/136 |
| 5,581,489 A | 12/1996 | Groothuis et al. | |
| 6,704,693 B1 | 3/2004 | Fan et al. | |
| 6,789,051 B1 | 9/2004 | Chen et al. | |
| 6,816,820 B1 * | 11/2004 | Friedl et al. | 703/2 |
| 7,321,365 B2 | 1/2008 | Brombolich | |
| 7,440,879 B2 | 10/2008 | Breitfeld et al. | |
| 2003/0141728 A1 * | 7/2003 | Arvelo et al. | 293/133 |
| 2004/0057243 A1 * | 3/2004 | Takii et al. | 362/512 |
| 2006/0044309 A1 | 3/2006 | Kanai et al. | |
| 2006/0217967 A1 | 9/2006 | Goertzen et al. | |
| 2007/0239419 A1 | 10/2007 | Dadkhah et al. | |
| 2009/0171631 A1 * | 7/2009 | Dweik et al. | 703/2 |
| 2010/0076738 A1 * | 3/2010 | Dean et al. | 703/7 |
| 2010/0280802 A1 * | 11/2010 | Calmels | 703/2 |
| 2011/0077912 A1 * | 3/2011 | Chen et al. | 703/1 |
| 2012/0136639 A1 * | 5/2012 | Narayana | 703/8 |

OTHER PUBLICATIONS

MSC Software Corporation, "Patran 2011 User's Guide," 2011, two hundred thirty-two pages. [Online] [Retrieved Apr. 9, 2013] Retrieved from the Internet <URL:http://simcompanion.mscsoftware.com/infocenter/index?page=content&id=DOC9928&cat=2011_PATRAN_DOCS&actp=LIST.>.

(Continued)

*Primary Examiner* — Kandasamy Thangavelu
(74) *Attorney, Agent, or Firm* — Fenwick & West LLP; Mark Duell

(57) ABSTRACT

An optimization wizard substantially automates the task of calculating thermal deflection analysis of a part. The optimization wizard requests a user to provide a mesh model representing the part and provide part definitions, such as the part's stiffness, expansion coefficient, etc. In addition, the wizard requests the user to provide boundary conditions by modifying normality of any elements in the mesh model and by fixing conditions of one or more nodes in all direction or in a one sliding direction. An initial and a final temperature may also be provided by the user. The optimization wizard receives the user inputs and generates an executable file describing the relationships and effects each input has on the part's deflection under the provided thermal conditions. The executable file is provided to a solver to determine the part's thermal deflection under the provided conditions.

20 Claims, 4 Drawing Sheets

(56) References Cited

OTHER PUBLICATIONS

PCT International Search Report and Written Opinion, PCT Application No. PCT/US2013/027754, May 6, 2013, eight pages.

Chaudhari, V. et al., "Automated Shell Meshing for Complex Surface Model Using Hypermesh," Date Unknown, five pages. [Online] [Retrieved May 2010] Retrieved from the Internet <URL:http://www.altair-india.com/edu/students/html/publiccontent/02_FEM_FEA_Automated_Shell_Meshing_For_General_Electricals_Aviation.pdf>.

Siemens PLM Software, "Femap automatic meshing simplifies virtual testing of even the toughest assignments," 2008, four pages. [Online] [Retrieved May 2010] Retrieved from the Internet URL:http://www.endurasim.com.au/web_images/Femap-V10-New.pdf.

* cited by examiner

THERMAL DEFLECTION ANALYSIS

FIELD OF THE INVENTION

The present invention relates to the field of thermal deflection analysis for optimization, and more specifically, to optimizing vehicle parts to meet fit and finish requirements over a life of the vehicle.

BACKGROUND

Vehicle body parts are often manufactured with slots and holes to attach the body part to a vehicle. The vehicle body parts including its slots and holes often deflect or deform under heat and other forces applied to the vehicle over its life during general use. The deflection or deformation often causes fit and finish issues over the life of the vehicle such that the vehicle body part may not fit properly to the frame of vehicle, leaving gaps between the frame and the part. Such gaps may affect the performance of the vehicle and generally reduces the aesthetic appeal of vehicle. Thus it is necessary to know how a vehicle body component will deflect and the location of the deflection to enable engineers to properly design the component onto the vehicle.

Deflection calculations, however, are often very cumbersome and require engineers to use complex formulas to determine the properties of deflection. Additionally, parts engineers generally may not have the mathematical background or skill to perform the deflection analysis. As such, specialized attention is often given to deflection analysis, sapping valuable resources that may be deployed elsewhere.

SUMMARY

Embodiments of the present invention provide a method (and corresponding system and computer program product) for determining thermal deflection of a vehicle body part.

The embodiments include a method of determining thermal deflection of a vehicle part at a load temperature, wherein the method includes importing a mesh model of the part representing the part in a three dimensional space. The method includes requesting a user to provide properties of the part wherein the properties effect deflection of the part. Additionally, the method includes requesting the user to provide boundary conditions for thermal deflection analysis wherein the boundary conditions effect deflection of at least one portion of the part and requesting the user to provide an initial and final temperature for analysis. In response to the requests, receiving the requested properties of the part, boundary conditions, initial and final temperature from the user and generating an executable file based on the received properties of the part, the boundary conditions and the initial and final temperatures wherein the file is executable by an application to calculate localized deflection in the part.

The embodiments include a system for determining thermal deflection of a vehicle part at a load temperature, wherein the method includes importing a mesh model of the part representing the part in a three dimensional space. The method includes requesting a user to provide properties of the part wherein the properties effect deflection of the part. Additionally, the method includes requesting the user to provide boundary conditions for thermal deflection analysis wherein the boundary conditions effect deflection of at least one portion of the part and requesting the user to provide an initial and final temperature for analysis. In response to the requests, receiving the requested properties of the part, boundary conditions, initial and final temperature from the user and generating an executable file based on the received properties of the part, the boundary conditions and the initial and final temperatures wherein the file is executable by an application to calculate localized deflection in the part.

The embodiments include a computer program product for determining thermal deflection of a vehicle part at a load temperature, wherein computer program product comprises a computer-readable storage medium containing computer program code for importing a mesh model of the part representing the part in a three dimensional space. The computer program product includes requesting a user to provide properties of the part wherein the properties effect deflection of the part. Additionally, the computer program product includes requesting the user to provide boundary conditions for thermal deflection analysis wherein the boundary conditions effect deflection of at least one portion of the part and requesting the user to provide an initial and final temperature for analysis. In response to the requests, receiving the requested properties of the part, boundary conditions, initial and final temperature from the user and generating an executable file based on the received properties of the part, the boundary conditions and the initial and final temperatures wherein the file is executable by an application to calculate localized deflection in the part.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

Figure 1:
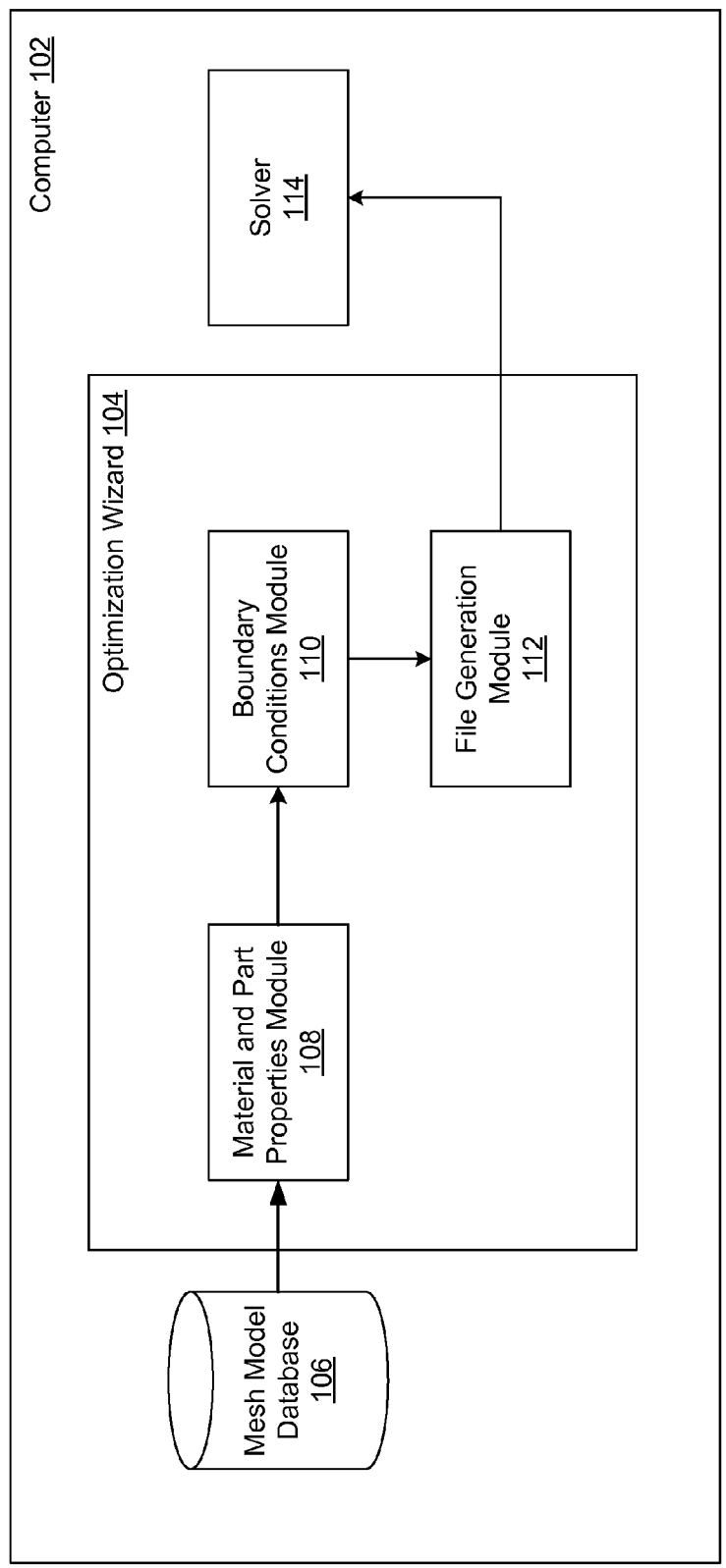
FIG. 1 is a high-level block diagram of a computing environment for performing thermal deflection analysis according to one embodiment of the present invention.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which are set forth in the claims.

System Architecture

FIG. 1 an illustration of a computer to execute for performing a thermal deflection analysis, in accordance with one embodiment. The computer 102 includes a mesh model database 106, a material and part properties module 108, a boundary conditions module 110, a file generation module 112 and a solver 114.

In one embodiment, the computer 102 is an electronic device used by a user to perform computing tasks such as executing one or more applications including an optimization wizard 104 and a solver. The computer 102 may comprise any computing system with a processor and a memory. For example, the computer 102 may be desktop computer, one or more desktop computers connected over a network or one or more servers connected together in a network (e.g., a local area network, a wide area network and/or a combination of these networks). A computer 102 is described in greater detail in reference to FIG. 2.

The vehicle parts may be optimized to minimize the effect of thermal deflection on fit and finish of a vehicle part during a life of the vehicle. For example, a vehicle part may deflect under varying temperatures when used in a variety of conditions. The thermal deflection caused by such temperatures may cause the vehicle part to deflect and separate from a vehicle frame. The amount of separation varies based on the amount of deflection. The separation between the vehicle part and the frame may cause performance issues or diminish the visual appearance of the vehicle. For example, the vehicle may look poorly manufactured if there is a high degree of separation between the parts and the frames of the vehicle. As such, the embodiments described herein optimize a vehicle body part to minimize the amount of separation between the vehicle part and the frame during the life of the vehicle.

The optimization wizard 104 is a program executing on the computer 102. The optimization wizard 104 receives a mesh model from a mesh model database 106 and generates an executable file based on inputs received from a user such that the executable file may be provided to a solver 112 and the thermal deflection or deformation of the meshed part may be calculated. In one embodiment, the optimization wizard is executed in a HYPERVIEW application, wherein the executable file is executable in an ABAQUS application by Simulia. ABAQUS provides finite element modeling and analysis solutions for simulating behavior of materials, processes and products, wherein the ABAQUS program creates an executable file as part of the finite element modeling. HYPERVIEW from Altair Engineering is a post-processing and visualization environment for finite element analysis, multi-body system simulation, digital video, and engineering data. Although ABAQUS and HYPERVIEW are provided herein as examples, other applications known in the art enabled to perform a similar functionality may be used to execute the optimization wizard. In one embodiment, the optimization wizard 104 receives user inputs by generating one or more user input interfaces prompting a user to enter data for calculating thermal deflection for a meshed part. User inputs include, for example, mesh type, material property of the part, part properties, boundary conditions, load temperatures, etc. The optimization wizard 104 receives the user inputs, processes the mesh model and generates an executable file that can be processed by a solver 112 wherein the solver calculates the deflection caused on the part due to the user provided inputs. As such the optimization wizard 104 saves user time by substantially automating the process of calculating thermal deflection caused by temperatures and boundary conditions. Additionally, users are not required to know or understand the complex concepts and mathematics required to calculate thermal deflection. Therefore, users without specialized knowledge of deflection analysis are enabled to measure a part's deflection properties based on input temperatures and certain boundary conditions.

In one embodiment, the mesh model database 106 includes mesh models for one or more parts. Vehicle parts that can be meshed and analyzed for thermal deflection include but are not limited to bumper facia, vehicle grills, side sills, spoilers, exterior sash garnish and cowl tops. A mesh model may be a polygon mesh that defines a shape of a polyhedral object in three dimensional graphics. In one embodiment, the mesh model database 106 includes a mesh model of a bumper of a vehicle. Although a bumper of a vehicle is described in the specification herein, the deflection analysis may be provided for any part of a vehicle. The mesh model database 106 may be stored on a computer 102 or imported from another server or a computer.

In one embodiment, a mesh model from the mesh model database 106 is imported to the optimization wizard 104. The material and part properties module 108 requests a user to input parts definitions such as a type of mesh, material property of the part, part properties etc. In one embodiment, the parts definition module 108 receives properties input by the user and applies them to the mesh model such that the mesh model's thermal deflection may be calculated.

In one embodiment, the boundary conditions module 110 requests a user to input one or more boundary conditions that may affect the thermal deflection analysis of the mesh part. Boundary conditions affect how a meshed part may deform. For example, a user may provide that a slot in the mesh model may deform by sliding in one or more directions or a hole in the mesh model may not deform in any direction. Additionally, the boundary conditions module 110 may request a user to provide a load temperature that will be applied to the mesh model. In one embodiment, the boundary conditions module 110 receives one or more boundary conditions from a user and applies the boundary conditions to the mesh model such that the mesh model's thermal deflection may be calculated.

In one embodiment, the file generation module 112 generates an executable file that can be executed by a solver to determine a mesh's thermal deflection based on inputs received by the material and part properties module 108 and the boundary conditions module 108. In one embodiment, the file generation module 112 processes a mesh with material properties, part properties, boundary conditions and a temperature load such that relationships between the mesh and the user inputs are applied. In one embodiment, the executable file may be executed by a solver 114 such that the mesh's thermal deflection is calculated based on the relationships provided in the executable file by the file generation module 112.

In one embodiment, the solver 114 receives an executable file from the optimization wizard 104. The executable may include a mesh model, user inputs such as properties of the part represented by the mesh, boundary conditions including an initial and a load temperature and relationships between the mesh and the user inputs affecting how the mesh model deflects or deforms under an applied load. The solver 114 executes the executable file and determines thermal deflection of the mesh under the load temperature. In one embodiment, the solver 114 provides the results to the optimization wizard 104 wherein, the optimization wizard 104 may process the results and provide them to a user.

Computing System

Figure 2:
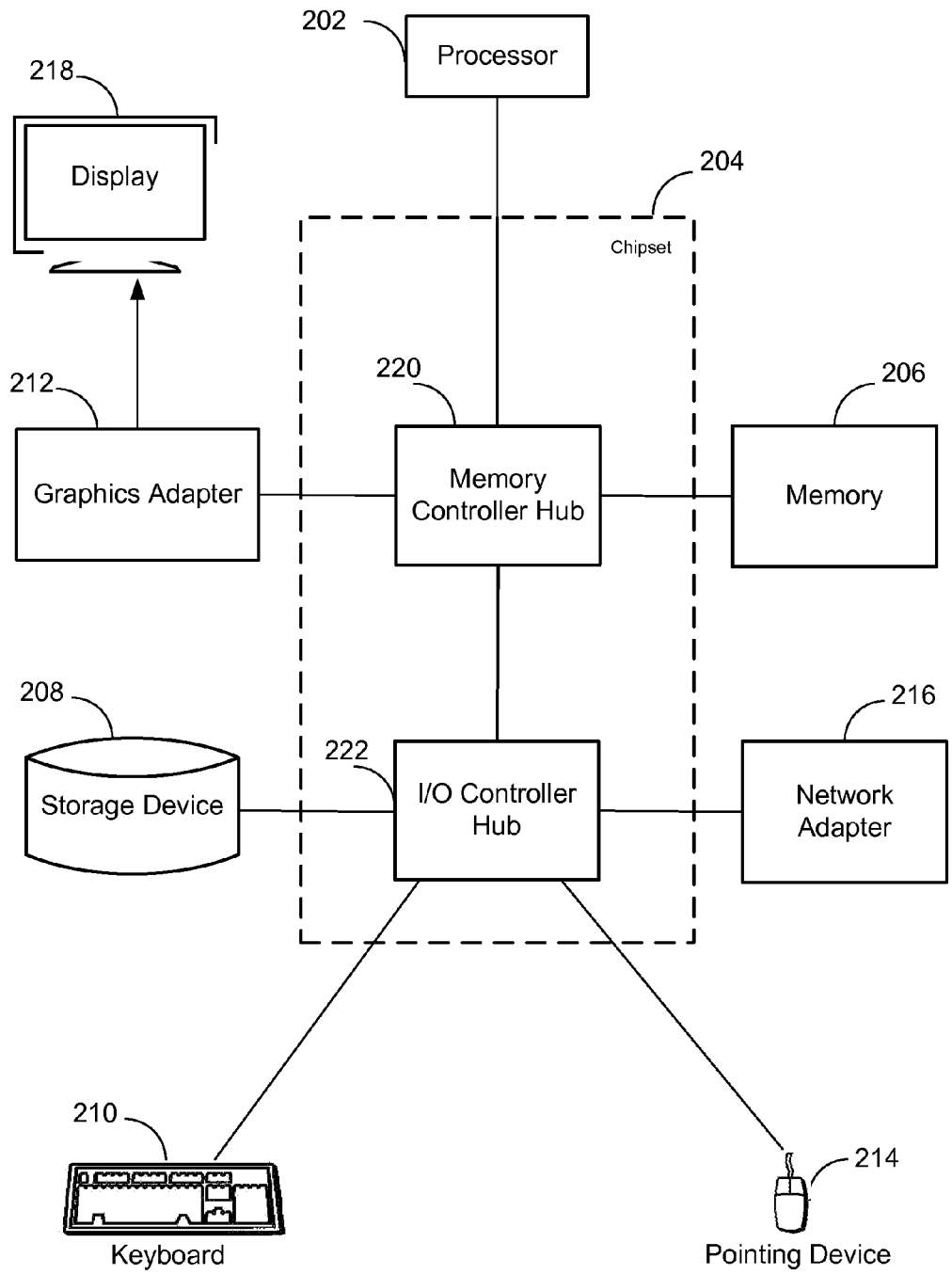
FIG. 2 is a high-level block diagram illustrating a functional view of a typical computer system for use as an entity illustrated in the environment of FIG. 1 according to an embodiment of the present invention.

FIG. 2 is a high-level block diagram illustrating a functional view of a typical computer system for use as an entity illustrated in the environment 100 of FIG. 1 according to an embodiment of the present invention. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 102 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 102. The graphics adapter 212 displays images and other information on the display device 218. The network adapter 216 couples the computer 102 to a network. Some embodiments of the computer 102 have different and/or other components than those shown in FIG. 2. The types of computer 102 can vary depending upon the embodiment and the desired processing power. The computer 102 may comprise multiple blade servers working together to provide the functionality described herein.

The computer 102 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The above description is included to illustrate the operation of the embodiments and is not meant to limit the scope of the invention. From the above discussion and attached appendices, many variations will be apparent to one skilled in the relevant art that would yet be encompassed by the spirit and scope of the invention.

Optimization Wizard

Figure 3:
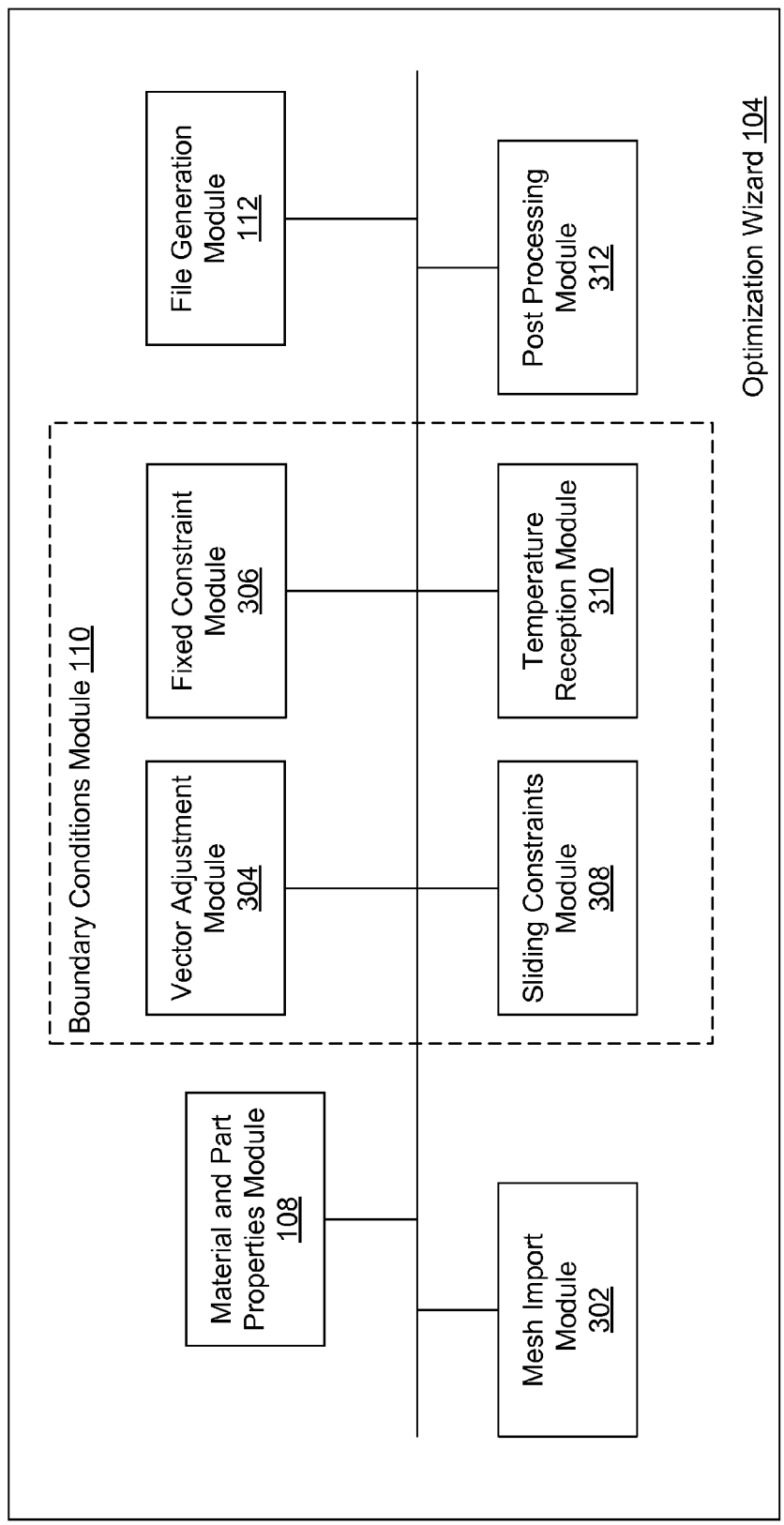
FIG. 3 is a high-level block diagram illustrating modules within an optimization application according to one embodiment.

FIG. 3 is a high-level block diagram illustrating modules within an optimization wizard application according to one embodiment. Those of skill in the art will recognize that other embodiments can have different and/or other modules than the ones described here, and that the functionalities can be distributed among the modules in a different manner.

As shown in FIG. 3, the optimization wizard application 104 includes an import module 302, a material and part properties module 108, a file generation module 112, a post processing module 312 and a boundary conditions module 110 including a vector adjustment module 304, a fixed constraint module 306, a sliding constraints module 308 and a load temperature module 310.

The import module 302 imports a mesh model to enable the optimization wizard to process it. In one embodiment, the import module 302 imports the mesh model from any file or directory on the computer 102 executing the optimization wizard 104 or from any other computer/server over a physical or a network connection. In one embodiment, the import module 302 requests a particular mesh model responsive to a user request received by the optimization wizard 104. An example of a mesh model is provided in "A mesh data structure for rendering and subdivision" by R. Tolbert et. al., incorporated herein in its entirety.

In one embodiment, the material and part properties module 108 requests a user to input additional information about the mesh, the part represented by the mesh and material properties of the part. Information about the mesh includes the type of mesh imported from the import module, including for example, a solid mesh, a shell mesh, etc. Part properties include the part's thickness, density, etc., as well as a type of part, including for example, a bumper, a side sill, etc. Material properties of the part may include, for example, its Young's modulus, thermal expansion coefficient, Poisson's ratio, etc.

In one embodiment, the material and part properties module 108 requests the additional information by providing a user interface elements wherein the user may input the requested information or select it from a drop-down menu. In one embodiment, the user may select one or more of the above properties and the material and part properties module 108 automatically updates the unfilled properties based on pre-existing data. For example, if a user provides that a mesh is for a car's bumper, the material and part properties module 108 may update the part's thickness, density, Young's modulus, Poisson's ratio, expansion coefficient, etc., for the part. In one embodiment, the material and part properties module 108 receives the requested information from the user. As described in the specification, the received information may include details about the mesh model, the part represented by the mesh and material properties of the mesh. In one embodiment, the material and part properties module 108 associates the received information with the mesh model such that a solver may determine the mesh's deformation based on its material and part properties.

In one embodiment, the boundary conditions module 110 requests boundary conditions from the user and applies the boundary conditions to the mesh model such that thermal deflection of the part represented by the mesh may be calculated. In one embodiment, a vector adjustment module 304 modifies a received mesh model to adjust one or more vectors that may cause an error on the solver 114. Each mesh received by the optimization wizard 104 is comprised of nodes and elements, wherein each node has a vector. In yet another embodiment, the vector adjustment module 304 displays the orientation of each vector to the user in a user interface. Additionally, the vector adjustment module 304 may also provide user interface elements wherein a user may provide an updated orientation of each module. As such, a user may update the orientation of each vector that may be incorrectly provided in the mesh model received by the optimization wizard 104. In one embodiment, the vector adjustment module 304 updates the orientation of vectors wherein the user provides an update definition. In another embodiment, the vector adjustment module 304 automatically modifies orientation of vectors that are different than the orientation of a majority of the vectors in the mesh. The vector adjustment module 304 updates the mesh model by changing the orientation of vectors in the mesh model as appropriate.

In one embodiment, the optimization wizard 104 generates a user interface wherein a user may select to apply boundary condition by constraining the boundary condition in all directions or a sliding constraint in one direction. Wherein a user selects to constraint boundary condition in all directions, the fixed constraint module 306 identifies nodes along edges of a hole or a circle within the mesh. Holes in a vehicle part may be used to clamp the part to a vehicle body and therefore may not deform under an applied temperature load. As such, a node selected at the edge of a hole or a circle in the mesh is provided with a fixed boundary condition in all directions. Wherein a node at the edge of a circle is selected, all the nodes in the circle are constrained in all directions by the fixed constraint module 306. In one embodiment, the fixed constraint module 306 applies the fixed boundary condition to each circle node in the mesh model and updates the mesh model accordingly.

In one embodiment, wherein a user selects to apply sliding boundary condition in one direction, the sliding constraint module 308 identifies one or more nodes along an axis of the slot. Additionally, the sliding constraint module 308 generates a user interface wherein a user is enabled to select a node at an edge of a slot. In an instance wherein a node at an edge of a slot is selected, the sliding constraint module 308 generates a user interface requesting the user to select a sliding direction by selecting two additional nodes along the slot axis. Wherein two additional nodes are selected, the sliding constraint module 308 creates a local axis with a default direction and a required sliding movement. The sliding constrain module 308 may be provided by an application known in the art, such as ABAQUS for performing finite element modeling and analysis. ABAQUS, for example, allows a user to select two nodes and applying sliding movement to a slot automatically. In one embodiment, the sliding constraint module 308 generates user interfaces requesting a user to provide sliding direction for each slot in the mesh model. The sliding constraint module 308 applies sliding boundary condition in the direction provided by the user to the mesh.

In one embodiment, the temperature reception module 310 generates a user interface requesting a user to enter an initial temperature and a final temperature for the thermal deflection analysis. In addition, the user may be requested to select whether to include gravity in the deflection analysis. In one embodiment, the temperature reception module 310 receives the requested user inputs and applies them as conditions to the mesh for the thermal deflection analysis.

In one embodiment, the file generation module 112 generates an executable file including the mesh model received from the mesh import module 302 and the information received by the material and part properties module 108 and the boundary conditions module 110. For example, the executable file may include information including, but not limited to mesh type, part properties, material properties of the part, vector directions of the mesh nodes, fixed constraints for holes or circles within the mesh, sliding boundary conditions for slots in the mesh, an initial and a load temperature. The executable file may be executed by a solver 114 to calculate thermal deflection of the vehicle part under the boundary conditions and the load temperature. In one embodiment, the executable file is provided to a solver 114.

In one embodiment, the post processing module 312 processes the information provided by the solver 114 and displays the results in a graphical format such that a user may see localized deformation caused by heat. An example of an application with a post processing module 312 is HYPERVIEW application; it has a tool with functionality to see graphical deformation caused by heat. It is noted that another application known in the art for post processing a deflection analysis may be used. In one embodiment, the post processing module 312 processes the results received from the solver and creates a file such that the file may be viewed on another program executing on a computing device.

As such, the optimization wizard 104 substantially automates the process of calculating thermal deflection for a part. In addition, the optimization wizard 104 lowers the technical knowledge a user must have in order to calculate thermal deflection, thereby reducing costs and human errors that may be associated with such a calculation.

Operation and Use

Figure 4:
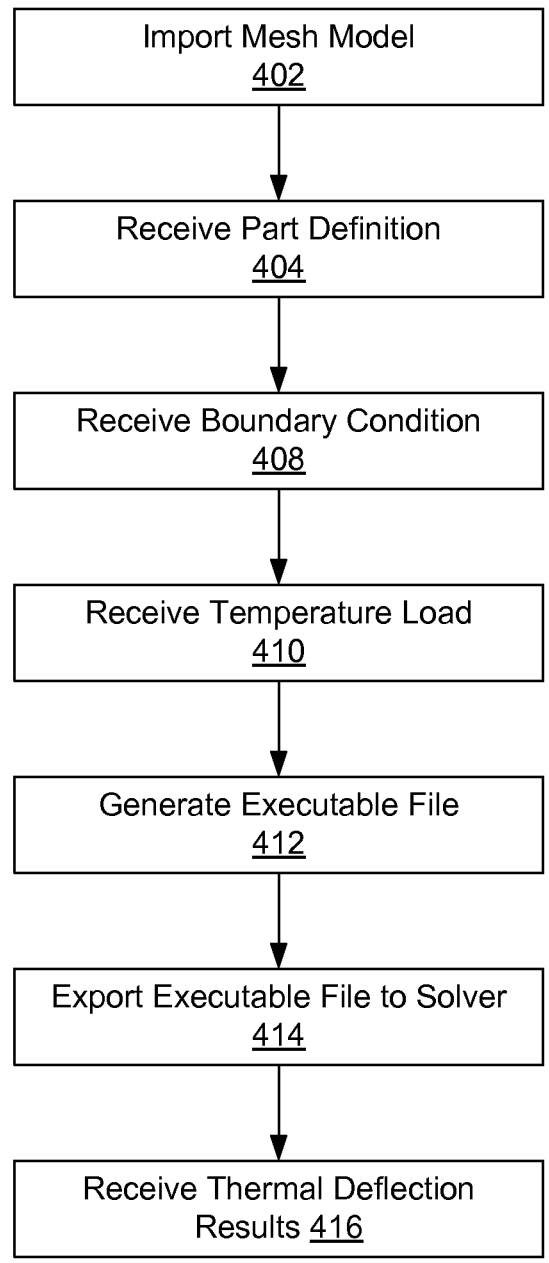
FIG. 4 is a flowchart of a method of performing thermal deflection analysis in accordance with one embodiment of the in-vehicle system.

FIG. 4 is a flowchart of a method of automating thermal deflection analysis, in accordance with an embodiment of the invention. The process imports 402 a mesh model in an application enabled to process the mesh model by applying boundary conditions. In one embodiment, the mesh model is imported 402 from another application executing on a same or a different computer. The mesh model may be for a part of a vehicle, such as, for example, a bumper.

In one embodiment, the process receives 404 definitions for the part. For example, the process may receive 404 a descriptor of a part, identifying the part as a bumper, a side sill, etc. In one embodiment, additional information about the part, such as its stiffness, compression, thickness, etc., is received 404. The process updates the definition of the part based on the user inputs.

In one embodiment, the process receives 408 boundary conditions from a user. In one embodiment, a user is requested or prompted to review and change orientation of one or more vectors of nodes within the mesh model that may be incorrect or different from the orientation of the other nodes in the mesh model. The prompting can be a separate prompt or request to change the orientation or may be the display of the mesh model information that the user can change. That is, prompting or requesting as used herein may, but does not require, an explicit display or a question be presented to the user. The process modifies the mesh model based on the user input. In addition, the process generates a user interface requesting the user to provide whether to fix boundary condition in all directions or a sliding constraint in one direction. Wherein a fixed constrain in all directions is selected, the process identifies nodes along edges of a circle and applies the fixed constraints to each node in the circle. Wherein a sliding constraint in one direction is selected, the process identifies nodes along an axis of a slot within the mesh. Additionally, the process requests the user to select two additional nodes along an axis of the slot to determine a sliding direction. In one embodiment, the process creates a local axis with default direction and required sliding movement. The sliding constraints are applied to the mesh model. In one embodiment, the process receives 410 an initial and a final temperature from a user.

In one embodiment, the process generates 412 an executable file. For example, an application such as HYPERVIEW generates an executable file for an application such as ABAQUS. It is noted that HYPERVIEW and ABAQUS applications are exemplary and other applications known in the art may be used to generate an executable file for finite element modeling and analysis. In one embodiment, the process generates 412 an executable file including the imported mesh model and the received 404 part definition, received 408 boundary condition and received 410 temperature load. The executable file may be executed by a solver to calculate a thermal deflection of the mesh model based on the received constraints. In one embodiment, the executable file is exported 414 to a solver. A solver such as ABAQUS may be used to execute the executable file. The solver uses the parts definitions and the boundary conditions to calculate thermal deflection for the provided mesh model.

In one embodiment, the process receives 416 the results of the thermal deflection analysis from the solver 114 and provides it to the user. In another embodiment, the process may generate a file providing the results of the thermal deflection analysis in a file format that can be opened in another application for further analysis. The results of the thermal deflection may show deformation that occurs at one or more node of the mesh. The deformation may capture a reaction force applied to the mesh model at a load temperature. In one embodiment, the deformation captures distance a node has moved from its original state as a result of the applied load.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A computer based method for calculating thermal deflection of a part at a load temperature, the method comprising:
   importing a mesh model of the part, the mesh model representing the part in a three dimensional space;
   requesting a user to provide properties of the part, the properties affecting deflection of the part;
   receiving a boundary condition selection from the user, the boundary condition selection comprising a boundary condition and one or more nodes of the mesh model, the one or more nodes located along an edge of a portion of the part;
   identifying additional nodes along the edge of the portion of the part based on the selected one or more nodes and the boundary condition;
   applying the boundary condition to the selected one or more nodes and to the identified additional nodes;
   requesting the user to provide an initial temperature of the part and a load temperature of the part for analysis;
   receiving the requested properties of the part, the initial temperature, and the load temperature; and
   generating an executable file based on the received properties of the part, the boundary condition, the initial temperature, and the load temperature, the file executable by an application to calculate localized deflection in the part.

2. The method of claim 1, wherein the mesh model represents a bumper of a vehicle.

3. The method of claim 1, wherein a property of the part comprises at least one of a thickness of the part and a density of the part.

4. The method of claim 1, wherein a property of the part comprises a material property of the part, including at least one of a stiffness of the part, a compression ratio of the part, and an expansion coefficient of the part.

5. The method of claim 1, further comprising requesting the user to provide properties of the mesh model to enable a solver to compute thermal deflection of the mesh model.

6. The method of claim 1, further comprising:
displaying orientation of vectors in the received mesh model;
requesting the user to change an orientation of a vector if the orientation of the vector is incongruent with the mesh model;
receiving a user input to change the orientation of the vector; and
updating the mesh model with an updated vector orientation responsive to the user input.

7. The method of claim 1, wherein receiving the boundary condition selection comprises requesting the user to select at least one of a fixed boundary condition in all directions and a sliding boundary condition in one direction.

8. The method of claim 7, wherein receiving the boundary condition selection comprises requesting the user to select a node at an edge of a hole in the mesh model responsive to the user selecting the fixed boundary condition in all directions.

9. The method of claim 8, wherein identifying the additional nodes along the edge of the portion of the part comprises:
identifying the additional nodes from nodes around the hole in the mesh model responsive to the user selecting the node at the edge of the hole in the mesh model.

10. The method of claim 7, wherein receiving the boundary condition selection comprises requesting the user to select a first node at an edge of a slot in the mesh model responsive to the user selecting the sliding boundary condition in one direction.

11. The method of claim 10, wherein identifying the additional nodes along the edge of the portion of the part comprises:
requesting the user to select a second node at the edge of the slot responsive to receiving a selection of the first node from the user; and
identifying the additional nodes from nodes along a local axis between the first node and the second node.

12. The method of claim 1, further comprising:
sending the executable file to a solver responsive to generating the executable file;
executing the file in the solver; and
receiving a measure of deformation at each node caused by the load temperature, the measure of deformation affected by the properties of the part represented by the mesh model and the boundary condition.

13. The method of claim 1, further comprising requesting a first feature affecting deflection of the part; and
if the first feature includes additional parameters, automatically requesting one or more of said additional parameters.

14. A system for calculating thermal deflection of a part at a load temperature, the system comprising:
a computer processor for executing executable computer program code;
a computer-readable storage medium containing the executable computer program code for performing a method comprising:
importing a mesh model of the part, the mesh model representing the part in a three dimensional space;
requesting a user to provide properties of the part, the properties affecting deflection of the part;
receiving a boundary condition selection from the user, the boundary condition selection comprising a boundary condition and one or more nodes of the mesh model, the one or more nodes located along an edge of a portion of the part;
identifying additional nodes along the edge of the portion of the part based on the selected one or more nodes and the boundary condition;
applying the boundary condition to the selected one or more nodes and to the identified additional nodes;
requesting the user to provide an initial temperature of the part and a load temperature of the part for analysis;
receiving the requested properties of the part, the initial temperature, and the load temperature; and
generating an executable file based on the received properties of the part, the boundary condition, the initial temperature, and the load temperature, the file executable by an application to calculate localized deflection in the part.

15. The system of claim 14, wherein the mesh model represents a bumper of a vehicle.

16. The system of claim 14, wherein a property of the part comprises at least one of a thickness of the part and a density of the part.

17. The system of claim 14, wherein a property of the part comprises a material property of the part, including at least one of stiffness of the part, a compression ratio of the part, and an expansion coefficient of the part.

18. The system of claim 14, the computer program code further comprising computer program code for requesting the user to provide properties of the mesh model to enable a solver to compute thermal deflection of the mesh model.

19. The system of claim 14, the computer program code further comprising computer program code for:
displaying orientation of vectors in the received mesh model;
requesting the user to change an orientation of a vector if the orientation of the vector is incongruent with the mesh model;
receiving a user input to change the orientation of the vector; and
updating the mesh model with an updated vector orientation responsive to the user input.

20. A computer program product for calculating thermal deflection of a part at a load temperature, the computer program product comprising a non-transitory computer-readable storage medium containing computer program code for:
importing a mesh model of the part, the mesh model representing the part in a three dimensional space;
requesting a user to provide properties of the part, the properties affecting deflection of the part;
receiving a boundary condition selection from the user, the boundary condition selection comprising a boundary condition and one or more nodes of the mesh model, the one or more nodes located along an edge of a portion of the part;
identifying additional nodes along the edge of the portion of the part based on the selected one or more nodes and the boundary condition;
applying the boundary condition to the selected one or more nodes and to the identified additional nodes;
requesting the user to provide an initial temperature of the part and a load temperature of the part for analysis;
receiving the requested properties of the part, the initial temperature, and the load temperature; and
generating an executable file based on the received properties of the part, the boundary condition, the initial temperature, and the load temperature, the file executable by an application to calculate localized deflection in the part.

\* \* \* \* \*